May 19, 1936.  S. MORSE  2,040,869

METHOD OF HEAT DISTRIBUTION

Filed Oct. 11, 1933

INVENTOR
*Sterne Morse*
BY
ATTORNEY

Patented May 19, 1936

2,040,869

UNITED STATES PATENT OFFICE 2,040,869

METHOD OF HEAT DISTRIBUTION

Sterne Morse, Richmond Heights, Ohio

Application October 11, 1933, Serial No. 693,211

4 Claims. (Cl. 237—81)

This invention is concerned with systems of heat distribution.

An object is the provision of a heat distribution system in which heat energy is distributed at ordinary temperatures with the consequent elimination of heat losses from radiation and subsequently raised in temperature at the point of use. In this way it is possible to distribute heat energy by ordinary pipes buried in the earth without the necessity for heat insulation or for the provision of tunnels or conduits for the protection of the elaborate heat insulation ordinarily required by a steam system.

For many years heat in the form of steam has been distributed from central stations. This can be successfully accomplished where the individual users are large and the lines are short, but in cases where it is desired to distribute heat in this way over long distances and especially to a great number of points where the individual consumption is small, it has been found to be not feasible on account of radiation losses from the pipes. It has for this reason been impracticable to distribute steam to heat buildings unless the latter were in a built-up city district such as a downtown district, that is, it has not been practicable to use this method of distributing steam to heat, for example, suburban houses located in a wide area.

The present invention contemplates the distribution of heat in the form of a vapor which can, at the point where the heat is to be used, be absorbed in a solvent for that vapor. The process uses certain principles utilized in the absorption system of refrigeration, and contemplates the production and distribution of a gas such as ammonia gas which is distributed at ordinary temperatures to the locations at which it is desired to develop heat at higher temperatures. At these places the gas, for example ammonia, is absorbed in a solvent, for example water, which is separately distributed, and the resulting strong solution is then returned to the central station.

While, as before mentioned, this process bears some similarity to the absorption method of operating a refrigerating machine, the principles involved have not, as far as I am aware, been used to distribute heat.

It has, moreover, an essential difference in operation from the operation of an absorption refrigerating system in that the working vapor which may be either ammonia or carbon dioxide is not condensed to the liquid form at all, but is produced at the central station as a vapor and absorbed at the users' premises in a solvent of that vapor.

As a general illustration of the system, and to illustrate the principles involved, we may take the case of a system using ammonia and water. Ammonia gas, when condensed to the liquid state, will give up a body of heat of about 500 B. t. u. per pound of ammonia condensed, the exact figures depending on the temperature and pressure at which this is done. When, however, instead of being condensed to the anhydrous liquid state, it is absorbed in a solvent, as for example water, it gives up this heat and in addition more heat, depending on the concentration of ammonia in the water in which the gas is being dissolved. This further amount of heat, ordinarily called the heat of dilution, is of the order of 200 B. t. u. per pound of ammonia were ammonia is being absorbed in a 35% watery solution. It falls regularly to zero at 100% ammonia concentration in the absorbing solution, and is nearly 400 B. t. u. at zero concentration of ammonia in that solution. The process is reversible in that, if we desire to separate the ammonia from the water in which it has been dissolved, we must add to the solution the heat which it gave out on absorbing the ammonia.

The temperature at which the heat may be given off from a solution of ammonia and water absorbing ammonia vapor will depend on the concentration of ammonia in the water and on the pressure of the ammonia vapor. If, for example, we are absorbing ammonia at a pressure of 70 lbs. per square inch absolute, a 10% solution of ammonia will absorb up to a temperature of about 250° F., while a 25% solution will absorb to temperatures up to about 180° F.

A system of this character may be conveniently divided into three parts: First, the generating or central station equipment; second, the distribution equipment; and, thirdly, the local equipment where the heat is to be used. The central equipment is very simple, consisting essentially of a boiler or kettle either direct fired or intermediately heated, a fractionating system in the form of a continuous still receiving the vapors from the boiler and the incoming strong liquid and rectifying them, and a circulating or strong liquor pump for circulating the aqua ammonia through the system. The distributing system is actually three systems, one system distributing ammonia vapor, one system distributing weak aqua ammonia, and the third system collecting and returning the strong aqua ammonia produced by the absorption of the ammonia vapor in the weak aqua. The local apparatus may be essentially similar in construction to the absorber used in ammonia absorption refrigerating machines and may be of any type found feasible for this purpose, such as nozzles blowing the vapor into a body of solution, sprays, or the tray type, the latter having theoretical advantages. It is, however, operated at entirely different levels of pressure and temperature, and in general, of concentration of aqua ammonia from the absorbers used in refrigeration, and for this reason the cooling coils of the ordinary absorber become coils for heating water or for generating low pressure steam.

When this method is utilized for house heating in the form of a public utility, it is desirable that the local apparatus be installed, not in the house, but in a well or other structure just outside the foundation. When placed in this position there is no danger of leakage of ammonia gas into the house. The water, or low-pressure steam, passing through the coils within the absorber is then brought in through the foundation and distributed throughout the house in the usual way.

In a system of this sort the chief difficulty lies in the prevention of leakage in the distribution system. For this reason it is desirable to enclose the whole distribution system, that is, the three pipes conveying vapor, strong aqua and weak aqua, in a fourth water-tight system which may conveniently, in the case of the larger mains, be of cast iron pipe in which a stationary or slowly moving body of water is maintained at atmospheric pressure or slightly more or less. If leakage from any of the three elements of the system occurs, it will be into this body of water, and the ammonia will not be lost. Furthermore, if we take advantage of the fact that whenever either an ammonia vapor is dissolved in water or a strong solution is diluted heat is developed, we may, by laying within or adjacent to this water pipe a resistance wire having a large thermal coefficient of resistance, obtain an immediate indication of leaks anywhere in the system. These resistance wires may be balanced in the method which is familiar in the case of burglar alarms, or in other ways to give indications of this character.

Another simpler method of taking care of leakage is to surround the service pipes, as before, with a fourth pipe, but simply maintain this pipe gas-tight. Leakage occurring in any of the three pressure pipes simply returns to the central station through this fourth pipe system, a low pressure, such as atmospheric, being maintained therein.

In the figures, in which like numerals refer to like parts,

Figure 1:
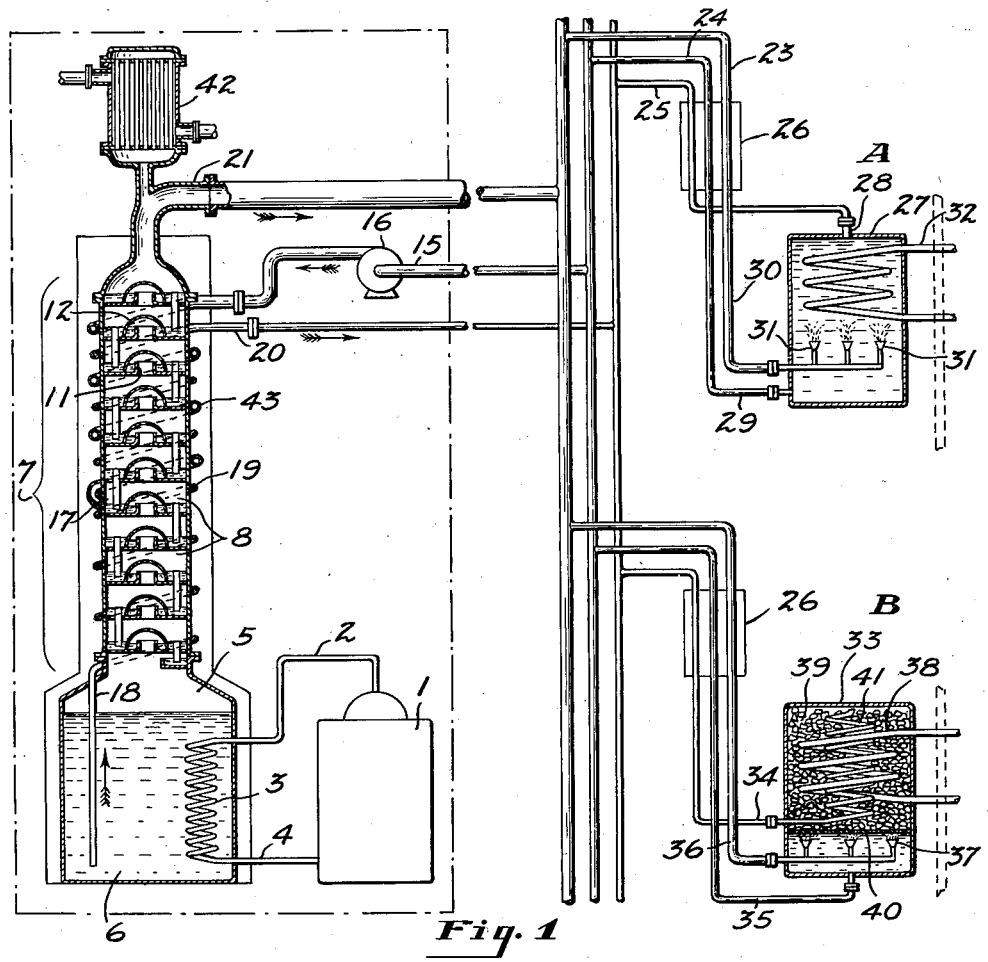
Figure 1 is a diagram in the form of a flow sheet, showing in diagrammatic form the apparatus for the central station, the distributing system, and the apparatus for two house heating systems supplied by the distributing system from the central station.
Figures 2, 3, 4:
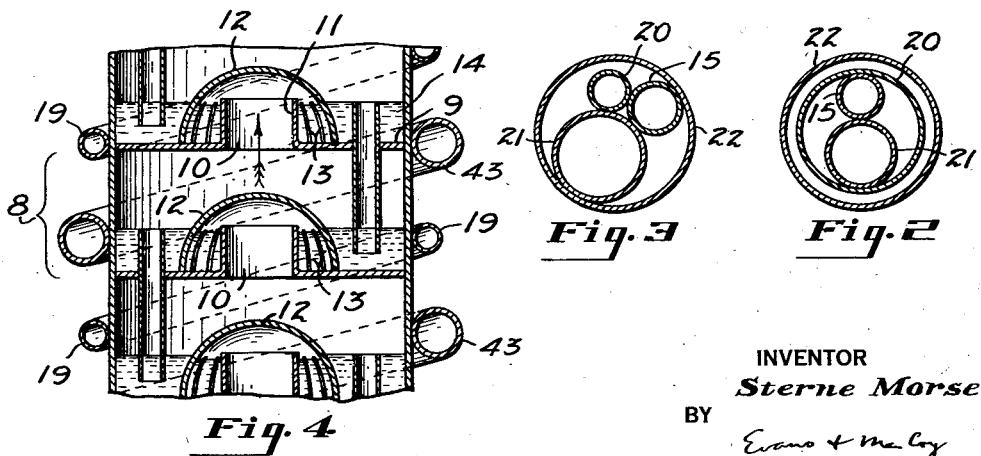
Fig. 2 shows in cross section one arrangement of a distributing line.
Fig. 3 shows a cross section of another arrangement.
Fig. 4 shows a portion of a suitable arrangement of the fractionating head shown in Fig. 1.

Referring now to Figures 1 and 4, there is shown a boiler 1 supplying steam through a pipe 2 to a coil 3, the condensed steam being returned to the boiler through a pipe 4. The coil 3, which may be either in the form of a coil or in any other suitable form of heat exchanger, serves to impart heat to a vapor generator 5. The liquid 6 in this generator is thereby boiled and the vapors thereof are passed to a fractionating head or continuous still 7, consisting of a number of sections 8 disposed one above the other in such manner that vapor may freely pass from a lower to an upper section. Each section which, for purposes of illustration is shown of the familiar bubble-cap type, consists of a partition 9 with a central aperture 10, this aperture being surrounded by a raised edge 11. Capping this is an approximately hemispherical member 12, in the edge of which are cut the slots 13. A body of liquid 14 is held in each section 8 and tends to increase in concentration in ammonia as one passes from the bottom to the top of the still. Water vapor tends to be condensed and ammonia vapor to be given off at each stage. There is a continual flow of liquid from top to bottom of the still, but conditions at any individual point remain approximately constant as regards temperature and concentration of the liquid and of the vapor phases.

Strong aqua ammonia produced in the operation of the system is brought to the central station by a main 15, being circulated by a pump 16 which raises it to the pressure reigning in the generator 5. It is brought to the top of the still 7 and descends in thermal relationship therewith through a coil 43, but the liquid is not brought into contact with the ascending vapor until it has been brought to conditions of temperature approximating those in that portion of the column where the concentration of the liquid is approximately that of the entering strong liquor. Here the strong liquor is caused to enter the column as at the point 17, and it descends the column from that point in contact with the ascending vapor. As it descends it gives off ammonia vapor and receives water vapor, becoming steadily less concentrated as regards ammonia until it reaches the generator 5. At this point it is relatively low in ammonia concentration and is here boiled, either as shown by means of a coil or by direct firing, to supply vapor sufficient to operate the column 7 which is the main point of apparatus for generating ammonia vapor. The weak aqua ammonia is withdrawn by way of the pipe 18 leading to the coil 19, which is in thermal relationship with the distilling column 7 to which the sensible heat of the weak aqua is imparted. The weak liquor passes from the coil 19 to the weak liquor main 20. The vapor passes from the top of the column to the vapor main 21. Suitable valves, not shown, are placed in the various mains to control pressure and flow of the three fluid constituents of the system.

A water cooled condenser 42 may or may not be provided to afford sufficient reflux into the top of the column 7 to insure that the vapor issuing from the top of the column shall be sufficiently free from water vapor so that no condensation of strong aqua ammonia occurs in the vapor main 21. It should be operated, if provided, to as small an extent as possible, and may, under certain circumstances, be omitted.

Referring now to Figs. 2 and 3, two arrangements are shown for the distribution lines. In Fig. 2 there is shown the vapor main 21 and the strong liquor main 15 in cross section, placed within the weak liquor main 20. This may or may not be enclosed in the water-tight conduit 22. If this latter conduit is used, water may be maintained as before stated in the space between pipes 20 and conduit 22, or the space may be left empty, as before described.

Fig. 3 shows another arrangement in which all three mains 15, 20 and 21 are independently laid within the conduit 22, water surrounding and filling the space within 22, as stated before, or the space being simply gas-tight, as before described.

Mains 15, 20 and 21 are suitably branched to cover the area which it is desired to serve, this branching not being shown in Figure 1, which on the right side shows a terminal branch main supplying two or more customers. The individual service mains 23, 24 and 25, which have suitable control valves, not shown, inserted in their course supply customer A. The service mains to this customer have in their course, and are made a part of, heat exchanger 26 designed to remove sensible heat from the strong liquor passing from the customer's absorber and to heat the vapor and weak liquor passing to it. This heat exchanger is shown diagrammatically as a three-fluid counter flow heat exchanger, but any other suitable form of heat exchanger may be used.

The absorber proper at the customer's premises may be of any convenient type. That shown at the customer's premises A is of relatively simple construction. It consists of a container 27 into the top of which the weak aqua is led by the pipe 28, after having traversed the heat exchanger 26. The strong aqua 29 passes out from the bottom by the pipe 29 and is then led to the heat exchanger 26. The vapor is supplied to the pipe 30, terminating in the nozzles 31 placed near the bottom of the container 27. A coil 32, in which circulates water from the house heating system, serves to remove the sensible heat developed by the absorption of the vapor in the weak aqua.

A more highly developed form of absorber is shown at the customer's premises B. Here advantage is taken of the fact that the absorption of ammonia at a given pressure is not an isothermal process, as is, for example, the absorption of steam in water.

At a given pressure a hot, dilute aqua is capable of absorbing ammonia vapor, while a stronger solution must be brought to a lower temperature before it can absorb ammonia under the given pressure. In this case a vessel 33 receives, as before, weak liquor through a pipe 34. This pipe passes into the bottom of the vessel 33 and ascends as the coil 41 inside of that vessel to its top, at which point it ends, here delivering the weak liquor into the body of the vessel 33. Strong liquor is withdrawn by the pipe 35 at the bottom and vapor is blown in at the bottom through the pipe 36, terminating in the nozzles 37. As before, a coil 38, in which the water of the house heating system circulates, removes the sensible heat. The interior of the container or vessel 33, however, is loosely filled with the finely divided material 39, the object being, in the first place to insure a very circuitous passage for the ascending vapor, and in the second place to prevent circulation of the liquid within the vessel 33. A perforated partition 40 is shown as supporting the material 39 above the level of the nozzles 37. In consequence of the presence of this material there is a considerable temperature range between the top and the bottom of the container 33, the bottom being relatively cold, containing, however, stronger liquor, the top, being relatively hot, containing progressively weaker but hotter liquid. In this way it is possible to develop heat in an ascending series of temperature levels, this heat being absorbed by the circulating water at each temperature level. A very much more concentrated solution can be taken off through pipe 35 than would otherwise be the case if the whole absorber were operating at substantially the same temperature level and the circulating water can be raised to a higher temperature for the same concentration of strong liquor.

At the customer's premises control of temperature and amount of heat developed is very easy. The amount of heat developed is, of course, proportional roughly to the amount of vapor which is absorbed in the weak aqua. The temperature which can be obtained is dependent on the proportion of flow between the flow of vapor and the flow of weak aqua. If the proportion of weak aqua to vapor is large, the temperature reached will be high; if low, it will be low. Suitable regulating devices may be used to control both the amount of heat developed and the temperature reached in this way.

While I have described this system with special reference to ammonia as the vapor and water as the solvent in which the vapor is soluble, inasmuch as these two substances are cheap and are peculiarly suitable for apparatus constructed of steel, other vapors and solvents can be used. Carbon dioxide, for example, may be used as the vapor, an amine or a watery solution of an alkaline carbonate being used as the solvent.

Organic gases such as methane, ethane or their halogenated derivatives, may be used as the vapors if at high pressure, and solvents for them may be the so-called "scrubbing oils", or organic gases such as formaldehyde, highly soluble in water, may be used with water as the solvent. Such combinations and others, if used to distribute heat energy in the form of latent heat of a vapor, uncondensed under the conditions of pressure at which it is distributed, and distributed at the temperature of the surroundings from a central plant to a plurality of points of use of that heat, the heat being elevated in temperature at the points of use by solution of the vapor in a suitable solvent, fall within the scope of my invention.

It will be seen that I have devised a system of heat distribution in which heat energy may be distributed in the form of the latent heat of a vapor distributed at the temperature of the surroundings with consequently no radiation of sensible heat; that I have described a means by which this latent heat may be raised in temperature to useful levels at any desired point; that the system described requires very little more heat put in at the central station than is ultimately obtained at the points of use; that the system is of high capacity, not expensive to install or to operate, that it uses relatively simple and standard equipment which is capable of long life. From the customer's point of view it has every advantage of central heated systems as previously used in that this local heating system requires no attention, develops no objectionable fumes or dirt, and is relatively not costly inasmuch as a chimney—and even a cellar, is not necessarily required for the purposes of heating.

Furthermore, it is to be understood that the particular forms of apparatus shown and described, and the particular procedure set forth, are presented for purposes of explanation and illustration and that various modifications of said apparatus and procedure can be made without departing from my invention as defined in the appended claims.

What I claim is:

1. The method of distributing heat energy which comprises distributing from a central point a gas and a solvent for said gas independently to a plurality of points, said gas and said solvent having properties such that solution of the gas in the solvent is accompanied by evolution of heat, said gas being at such pressure as to remain in the gaseous state at the temperature surrounding the distribution system, absorbing said gas in said solvent at said points, whereby sensible heat at temperatures above said surrounding temperature is developed, utilizing such heat produced at such higher temperatures, returning the solution of said gas in said solvent to said central point, regenerating said gas from said solvent at said central point at substantially the same pressure at which it was absorbed and redistributing said regenerated gas and regenerated solvent.

2. The method of distributing heat energy to a plurality of points of use of said heat energy from a central point, which consists in distributing ammonia gas to said points through distribution pipes under such pressure as to be uncondensed at the temperature surrounding said pipes, separately distributing to said points a weak solution of ammonia in water, absorbing said ammonia gas in said weak solution of ammonia in water at said points whereby sensible heat at a higher temperature than the surrounding temperature is produced at said points and whereby a relatively strong solution of ammonia in water is produced, utilizing said sensible heat so produced from said strong solution, returning said strong solution to said central point, fractionally distilling said strong solution at substantially the same pressure at which said absorbing of said ammonia gas was performed, whereby said ammonia gas is regenerated together with said weak solution of ammonia in water.

3. The method of distributing heat energy which comprises distributing from a central point a gas and a solvent for said gas independently to a plurality of points, said gas and said solvent having properties such that solution of the gas in the solvent is accompanied by evolution of heat, said gas being at such pressure as to remain in the gaseous state at the temperature surrounding the distribution system, absorbing said gas in said solvent at said points, whereby sensible heat at temperatures above said surrounding temperature is developed, utilizing such heat produced at such higher temperatures, returning the solution of said gas in said solvent to said central point, regenerating said gas from said solvent at said central point at a higher pressure than that at which it was absorbed and redistributing said regenerated gas and regenerated solvent.

4. The method of distributing heat energy to a plurality of points of use of said heat energy from a central point, which consists in distributing ammonia gas to said points through distribution pipes under such pressure as to be uncondensed at the temperature surrounding said pipes, separately distributing to said points a weak solution of ammonia in water, absorbing said ammonia gas in said weak solution of ammonia in water at said points whereby sensible heat at a higher temperature than the surrounding temperature is produced at said points and whereby a relatively strong solution of ammonia in water is produced, utilizing said sensible heat so produced from said strong solution, returning said strong solution to said central point, fractionally distilling said strong solution at a higher pressure than that at which said absorbing of said ammonia gas was performed, whereby said ammonia gas is regenerated together with said weak solution of ammonia in water.

STERNE MORSE.